(12) United States Patent
O'Dowd et al.

(10) Patent No.: US 6,831,583 B1
(45) Date of Patent: Dec. 14, 2004

(54) INTEGRATED CIRCUIT COMPRISING A MICROPROCESSOR AND AN ANALOGUE TO DIGITAL CONVERTER WHICH IS SELECTIVELY OPERABLE UNDER THE CONTROL OF THE MICROPROCESSOR AND INDEPENDENTLY OF THE MICROPROCESSOR, AND A METHOD FOR OPERATING THE INTEGRATED CIRCUIT

(75) Inventors: Thomas Brendan O'Dowd, Limerick (IE); Gary Casey, Limerick (IE); Brian Joseph Moss, Limerick (IE); Fintan Michael Leamy, Ennis (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/287,967

(22) Filed: Nov. 5, 2002

(51) Int. Cl.[7] ........................ H03M 1/12; G05B 19/18
(52) U.S. Cl. ............................... 341/155; 700/3
(58) Field of Search .................. 341/155, 142, 341/165; 700/3, 79; 710/11; 711/118; 713/300

(56) References Cited

U.S. PATENT DOCUMENTS

| | | | | |
|---|---|---|---|---|
| 5,294,928 A | * | 3/1994 | Cooper et al. | 341/142 |
| 5,422,807 A | * | 6/1995 | Mitra et al. | 700/79 |
| 5,714,955 A | * | 2/1998 | Reay et al. | 341/155 |
| 6,038,400 A | * | 3/2000 | Bell et al. | 710/11 |
| 6,456,219 B1 | * | 9/2002 | Schreiber et al. | 341/155 |
| 6,542,106 B1 | * | 4/2003 | Darmawaskita et al. | 341/165 |
| 6,618,628 B1 | * | 9/2003 | Davlin et al. | 700/3 |
| 6,622,208 B2 | * | 9/2003 | North | 711/118 |
| 6,642,879 B2 | * | 11/2003 | Amar et al. | 341/155 |
| 6,681,332 B1 | * | 1/2004 | Byrne et al. | 713/300 |

* cited by examiner

Primary Examiner—Patrick Wamsley
(74) Attorney, Agent, or Firm—Wolf, Greenfield & Sacks, P.C.

(57) ABSTRACT

An integrated circuit (1) comprises a microprocessor (2), an ADC (3) and a serial interface (4) for communicating the integrated circuit with an external device. An analogue input port (5) is provided for inputting analogue signals to the ADC (3). A switch circuit (8) is provided for selectively and alternately configuring the integrated circuit (1) to operate in a first mode and in a second mode. In the first mode the serial interface (4) communicates with the microprocessor (2) through the switch circuit (8), and in the second mode the serial interface (4) communicates with the ADC (3) through the switch circuit (8). In the second mode conversion results are transferred from the ADC (3) through the switch circuit (8) to the serial interface (4) independently of the microprocessor (2) for transmission therefrom to an external device. In the first mode the ADC (3) is operable under the control of the microprocessor (2).

33 Claims, 3 Drawing Sheets

INTEGRATED CIRCUIT COMPRISING A MICROPROCESSOR AND AN ANALOGUE TO DIGITAL CONVERTER WHICH IS SELECTIVELY OPERABLE UNDER THE CONTROL OF THE MICROPROCESSOR AND INDEPENDENTLY OF THE MICROPROCESSOR, AND A METHOD FOR OPERATING THE INTEGRATED CIRCUIT

FIELD OF THE INVENTION

The present invention relates to an integrated circuit comprising a microprocessor and an analogue to digital converter (ADC) in which the ADC is selectively and alternately operable under the control of the microprocessor and independently thereof for transferring conversion results to an external device independently of the microprocessor, and the invention also relates to a method for operating the integrated circuit in a first mode in which the ADC is operated under the control of the microprocessor and in a second mode in which conversion results are transferred from the ADC to the external device independently of the microprocessor.

BACKGROUND TO THE INVENTION

Integrated circuits which comprise a microprocessor and an ADC have many advantages. For example, the microprocessor may be used to set up the signals to be converted by the ADC. The microprocessor can also communicate with other devices in the integrated circuit and external systems, which are external to the integrated circuit, and thus can transfer the conversion results from the ADC internally to the other devices in the integrated circuit, and/or externally of the integrated circuit to the external systems. A further advantage is that the conversion results from the ADC can subsequently be processed by the microprocessor. However, the provision of a microprocessor and an ADC in an integrated circuit can be disadvantageous, particularly where the processing rate of the microprocessor is less than the conversion rate of the ADC. If the conversion rate of the ADC is high with respect to the processing rate of the microprocessor, the microprocessor may have insufficient processing power to read the conversion results from the ADC and then to perform an operation on the conversion results, for example, to write the conversion results to on-chip or external memory. A further disadvantage of such a combination of a microprocessor and an ADC is that each time a conversion cycle has been completed by the ADC the microprocessor is required to transfer the conversion results from the ADC. This necessitates the microprocessor interrupting a current task in order to transfer the data from the ADC. This leads to inefficient operation of the microprocessor and the ADC, and in particular prevents the ADC operating at its full conversion rate. Furthermore, the processing time of the microprocessor available for carrying out other tasks is reduced.

Various solutions have been implemented to overcome these problems, however, none have been entirely satisfactory. One such solution requires the provision of a buffer to store the conversion results from the ADC, and on the assumption that the ADC will not be continuously converting at full speed, the microprocessor can then subsequently process or transfer the conversion results at its own speed. However, the disadvantage of this solution is that processing time of the microprocessor is still required in order to process or transfer the conversion results from the ADC. An alternative solution includes the provision of a direct memory access channel along which the conversion results from the ADC are transferred to memory. However, the disadvantage of this solution is that the microprocessor cannot access memory or other peripherals while the direct memory access is in progress.

There is therefore a need for an integrated circuit which comprises a microprocessor and an ADC in which the ADC is selectively and alternately operable under the control of the microprocessor, and independently thereof for transferring conversion results to an external device independently of the microprocessor, and there is also a need for a method for selectively operating the integrated circuit with the ADC operating under the control of the microprocessor and independently thereof for transferring the conversion results to the external device independently of the microprocessor.

The present invention is directed towards providing such an integrated circuit and a method.

SUMMARY OF THE INVENTION

According to the invention there is provided an integrated circuit comprising:
  a microprocessor,
  an analogue to digital converter (ADC),
  an interface for communicating the integrated circuit with an external device,
  a switch circuit for selectively and alternately configuring the integrated circuit to operate in a first mode with the microprocessor communicating with the interface through the switch circuit and the ADC operating in a dependent mode under the control of the microprocessor, and a second mode with the ADC operating in an independent mode communicating with the interface through the switch circuit for transferring conversion results from the ADC through the interface to an external device independently of the microprocessor.

Preferably, conversion results are transferred from the ADC to the interface when the integrated circuit is operating in the second mode without interfering with the operation of the microprocessor.

In one embodiment of the invention the switch circuit is responsive to the microprocessor for configuring the integrated circuit to operate in the first and second modes.

In another embodiment of the invention the interface is configurable by the microprocessor for transmitting conversion results from the ADC to the external device in the independent mode of operation of the ADC.

Preferably, the interface is selectively configurable by the microprocessor in one of a master mode and a slave mode for facilitating transmission of the conversion results to the external device from the ADC in the independent mode of operation of the ADC.

Advantageously, the ADC is selectively and alternately configurable by the microprocessor to operate alternately in the independent mode and the dependent mode.

In one embodiment of the invention the switch circuit is responsive to a signal outputted by the ADC in response to the ADC being configured by the microprocessor to operate in the one of the dependent mode and independent mode for configuring the integrated circuit to operate in the corresponding one of the first mode and the second mode.

In another embodiment of the invention the microprocessor is responsive to primary code stored in memory of the integrated circuit for operating the switch circuit for selectively and alternately configuring the integrated circuit to operate in the first mode and the second mode, and in one embodiment of the invention the memory is flash memory.

In a further embodiment of the invention the microprocessor is responsive to an externally generated signal for selectively and alternately configuring the integrated circuit to operate in the first mode and in the second mode.

In one embodiment of the invention each conversion result is transferred from the ADC to the interface in response to a signal from the ADC indicating the conversion result is ready.

In one embodiment of the invention the interface is an N-bit interface, and the ADC is of M-bit resolution, M being greater than N.

Preferably, a temporary storing register is provided for storing some of the M bits of each conversion result, while the other of the M bits of the conversion result are being transferred from the ADC to the interface.

In one embodiment of the invention the switch circuit selectively and alternately communicates the interface with the temporary storing register and the ADC for selectively and alternately transferring the bits stored in the temporary storing register to the interface and the bits to be transferred directly from the ADC to the interface.

Preferably, the switch circuit is responsive to a signal from the interface for selectively communicating the interface with the temporary storing register for transferring the bits of the conversion result from the temporary storing register to the interface.

Advantageously, the interface is a serial interface, and a counter is provided responsive to a clock signal clocking the bits out of the interface to the external device for counting the bits being transmitted from the interface, and the switch circuit is responsive to the counter for communicating the temporary storing register with the interface.

In one embodiment of the invention the data word width of the microprocessor is N-bits.

In another embodiment of the invention the interface is a serial interface.

In a further embodiment of the invention the interface is a serial protocol interface (SPI).

In a further embodiment of the invention a first register is provided communicable with an input switch circuit for selectively switching a plurality of analogue input channels to the ADC, the first register being provided for storing a first control code for controlling the input switch circuit for selecting a sequence in which the analogue input channels are to be switched to the ADC by the input switch circuit. Preferably, the first control code is writeable to the first register by the microprocessor. Advantageously, the first control code is writeable to the first register by the microprocessor under the control of the primary code stored in the memory.

In another embodiment of the invention a second register is provided communicable with the ADC, the second register being provided for storing a second control code for selecting the number of samples to be taken of each analogue input signal switched to the ADC through the input switch circuit from the analogue input channels. Preferably, the second control code is writeable to the second register by the microprocessor. Advantageously, the second control code is writeable to the second register by the microprocessor under the control of the primary code stored in the memory.

Additionally, the invention provides a method for operating an integrated circuit comprising an on-chip microprocessor, an on-chip ADC and an on-chip interface so that the ADC can carry out conversions independently of the microprocessor, the method comprising the steps of providing an on-chip switch circuit for selectively and alternately communicating the interface with the microprocessor and the ADC, and operating the switch circuit for selectively and alternately configuring the integrated circuit to operate in a first mode with the microprocessor communicating with the interface through the switch circuit and the ADC operating in a dependent mode under the control of the microprocessor, and a second mode with the ADC operating in an independent mode communicating with the interface through the switch circuit for transferring conversion results from the ADC through the interface to an external device independently of the microprocessor.

In one embodiment of the invention the microprocessor operates the switch circuit for selectively and alternately configuring the integrated circuit to operate in the first mode and the second mode.

In another embodiment of the invention the microprocessor selectively configures the interface for transmitting conversion results from the ADC to the external device in the independent mode of operation of the ADC.

In a further embodiment of the invention the microprocessor selectively and alternately configures the interface in a master mode and a slave mode for facilitating transmission of the conversion results to the external device from the ADC in the independent mode of operation of the ADC.

Preferably, the microprocessor selectively and alternately configures the ADC to operate in the independent mode and the dependent mode.

In one embodiment of the invention a primary code is stored in a memory in the integrated circuit chip, and the microprocessor is operable under the control of the primary code for configuring the integrated circuit between the first and second modes.

Preferably, the primary code is stored in a flash memory.

ADVANTAGES OF THE INVENTION

The advantages of the invention are many. By virtue of the fact that the integrated circuit is selectively operable in a first mode and in a second mode, and when operating in the second mode the ADC is operable independently of the microprocessor for transferring conversion results to the external device, the ADC when the integrated circuit is operating in the second mode can operate continuously at its full data conversion rate, subject to the external device to which the conversion results are being transferred. Additionally, when the integrated circuit is operating in the second mode the microprocessor is also operating independently of the ADC and without interference from the ADC, and thus the microprocessor has more time available to carry out other tasks, and furthermore, to carry out such tasks without interruptions from the ADC. When the integrated circuit is operating in the second mode the conversion results are written directly from the ADC to the interface and transmitted directly from the interface to the external device. The external device may be memory where the conversion results can be stored for subsequent processing by another external device or indeed by the microprocessor of the integrated circuit at a more convenient time, in which case, the stored conversion results would be read from the external memory by the microprocessor, and could be read through the interface when the integrated circuit is operating in the first mode, or any other I/O interface of the integrated circuit, and where the conversion results are read through another I/O interface of the integrated circuit, the conversion results could be read through such another I/O interface with the integrated circuit operating in the first or second modes. Alternatively, the conversion results could be transmitted from the interface to a processor of an external device which would process the conversion results independently of the microprocessor of the integrated circuit. Another advantage of the invention is that by having the integrated circuit selectively operable in the two modes, when it is desired to have the data conversions carried out under the control of the microprocessor, and for example, to have the conversion results processed by the microprocessor of the integrated circuit, the integrated circuit can be readily switched from the second mode of operation to the first mode.

A further advantage of the integrated circuit according to the invention is that when the integrated circuit is operating in the second mode if the microprocessor is not required, the operation of the microprocessor may be stopped by putting the microprocessor into a power saving or a low noise operating mode. Putting the microprocessor into a low noise mode during operation of the ADC has the added advantage that there is little or no danger of the microprocessor interfering with the performance of the ADC.

A further advantage of the integrated circuit according to the invention is that when the integrated circuit is operating in the second mode, the integrated circuit may be operated in a pseudo-direct memory access mode whereby conversion results are transferred to an external RAM through the interface. An additional advantage of the integrated circuit according to the invention is that when operating in the second mode the ADC may be set up for coherent sampling, whereby the ADC would operate in a timed mode or on an external start conversion mode for generating a defined number of samples at a precisely defined time period between each sample. When the ADC is so set up, Fast Fourier Transforms could be carried out on the conversion results.

Another advantage of the invention is that production test of the integrated circuit is simplified, since the testing of the ADC is not limited by the performance of the microprocessor, nor is it complicated by the need to use the microprocessor for processing the conversion results of the ADC. By merely operating the integrated circuit in the second mode, the ADC can be tested independently of the microprocessor.

The invention will be more clearly understood from the following description of some preferred embodiments thereof which are given by way of example only with reference to the accompanying drawings.

DETAILED DESCRIPTION OF PREFERRED EMBODIMENTS OF THE INVENTION

Figure 1:
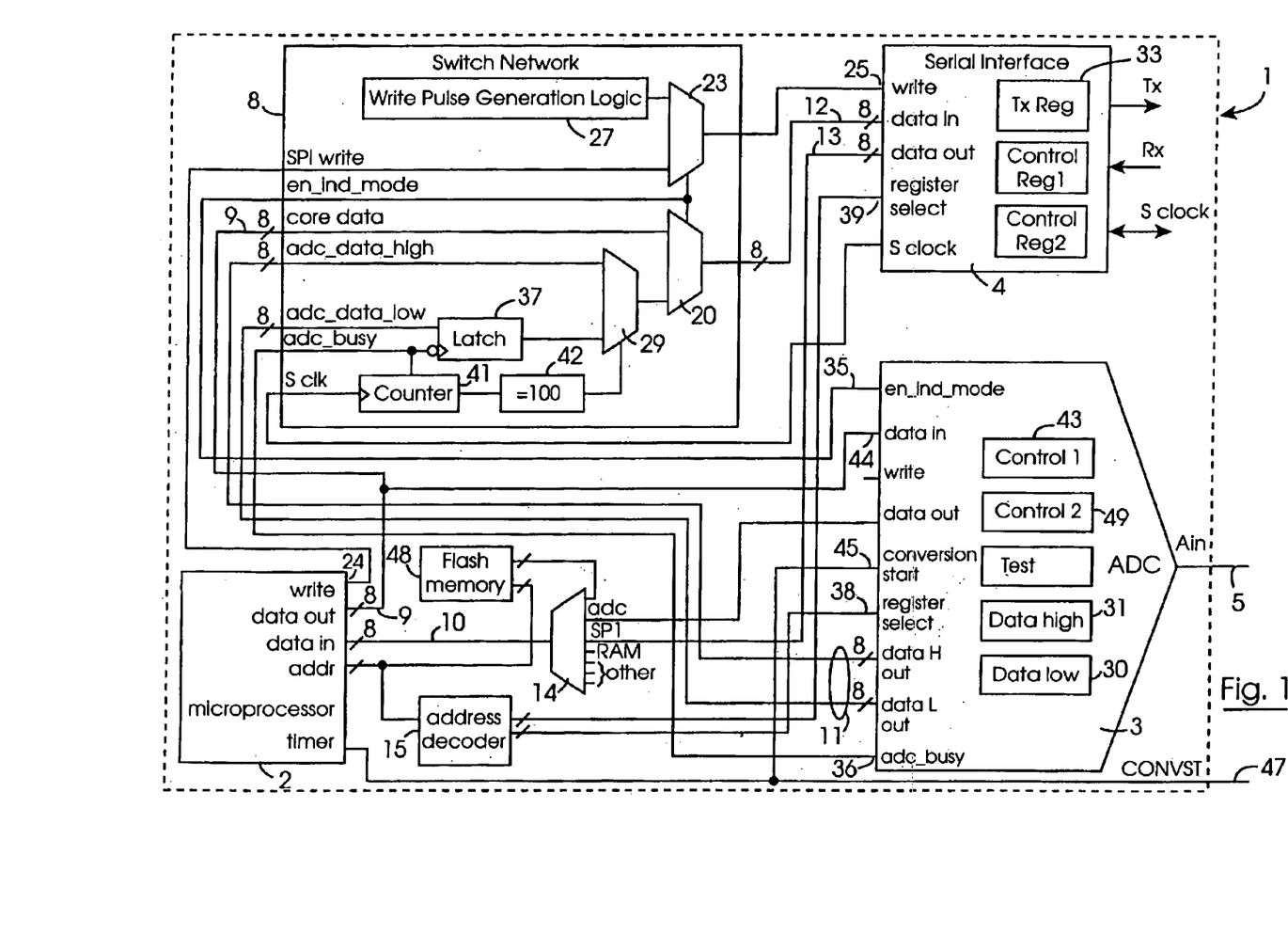
FIG. 1 is a block representation of an integrated circuit according to the invention.
Figure 2:
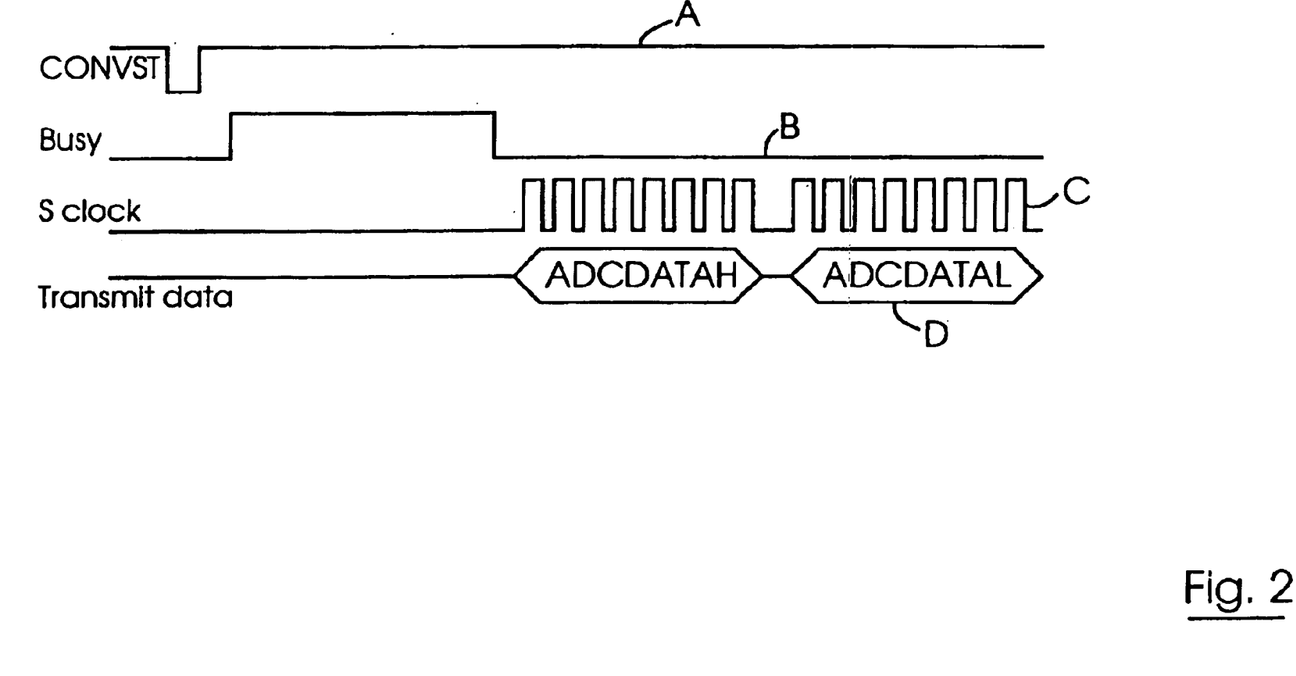
FIG. 2 is a timing diagram of the operation of the integrated circuit of FIG. 1.

Referring to the drawings and initially to FIGS. 1 and 2 there is illustrated an integrated circuit according to the invention indicated generally by the reference numeral 1. The integrated circuit 1 comprises a microprocessor 2, an analogue to digital converter (ADC) 3, a serial interface 4 and an analogue input port 5. The integrated circuit 1 comprises other components, for example, random access memory (RAM) and other input/output (I/O) ports and interfaces, for example, a parallel I/O port, however, since these components, interfaces and ports are not relevant to the invention, they are not illustrated, nor will they be described. Only the components and ports which are relevant to the invention are illustrated and will be described. The integrated circuit 1 comprises a switch circuit 8 which is responsive to the microprocessor 2 for selectively and alternately configuring the integrated circuit 1 in a first mode of operation and in a second mode of operation. In the first mode of operation of the integrated circuit 1, the ADC 3 is operable in a dependent mode under the control of the microprocessor 2, and the microprocessor 2 transfers conversion results from the ADC 3 which it subsequently processes, or alternatively transfers the conversion results to on-chip components such as memory, or through one of the I/O ports (not shown), including the serial interface 4 to external devices. In the second mode of operation of the integrated circuit, the ADC 3 is operable in an independent mode, whereby conversion results are transferred from the ADC 3 to the serial interface 4 for transmission therethrough to an external device, independently of the microprocessor 2 and without interfering with the operation of the microprocessor 2.

The microprocessor 2 has a data word width of N-bits, in this embodiment of the invention 8-bits, and the microprocessor 2 has a capability of executing one instruction every 1 microsecond. Data is outputted from the microprocessor 2 on an eight bit data out bus 9 and is inputted to the microprocessor 2 on an eight bit data in bus 10. The ADC is capable of converting 200,000 samples per second, and has an M-bit resolution, in this embodiment of the invention a twelve bit resolution ADC with a sixteen bit result word. The lower 12-bits of the result word contain the conversion result of a conversion from a sampled analogue input signal, and the higher 4-bits contain the identity of an input channel from which the analogue input signal was sampled. Conversion results are outputted from the ADC 3 on a sixteen bit data out bus 11. The serial interface 4 is a serial protocol interface (SPI), and is an 8-bit interface. Data is transferred to the serial interface 4 on a data in bus 12, and transferred from the serial interface 4 on a data out bus 13. A main multiplexer 14 selectively communicates the data in bus 10 of the microprocessor 2 with the ADC 3 when the ADC 3 is operating in the dependent mode under the control of the microprocessor 2, and the main multiplexer 14 also selectively communicates the data in bus 10 of the microprocessor 2 with the serial interface 4, RAM (not shown) and other components (not shown) of the integrated circuit 1. An address decoder 15 decodes addresses from the microprocessor 2 which are written to the ADC 3 and the serial interface 4 for selecting appropriate registers in the ADC 3 and the serial interface 4 which are to be used while the ADC 3 is operating in the independent mode, as will be described below, as well as for selecting appropriate registers in the ADC 3 and the serial interface 4 when the ADC 3 is operating in the dependent mode. A clock generator (not shown) is provided in the integrated circuit 1 for generating clock signals for controlling the transfer of data within and from the integrated circuit 1. Such clock signal generators and their operation in the control of data transfer will be well known to those skilled in the art.

Turning now to the switch circuit 8, the switch circuit 8 is configurable under the control of the microprocessor 2 for selectively and alternately switching the data out bus 9 of the microprocessor 2, and the data out bus 11 from the ADC 3 to the data in bus 12 of the serial interface 4 for transmission of data therethrough to an external device (not shown) alternately from the microprocessor 2 and the ADC 3. The switch circuit 8 comprises a first primary switch, namely, a first primary multiplexer 20 for selectively and alternately switching data from the data out bus 9 of the microprocessor 2 to the data in bus 12 of the serial interface 4, and conversion results on the data out bus 11 of the ADC 3 to the serial interface 4. A second primary switch, namely, a second primary multiplexer 23 selectively and alternately switches a write output 24 of the microprocessor 2 to a write input 25 of the serial interface 4 for controlling the transfer of data from the microprocessor 2 to the serial interface 4, when the integrated circuit 1 is operating in the first mode, and for selectively switching a write signal generated in a write pulse generation logic circuit 27 to the write input 25 of the serial interface 4 for controlling the transfer of data from the ADC 3 to the serial interface 4, when the integrated circuit 1 is operating in the second mode. The generation of the write signal in the logic circuit 27 is discussed below.

Since in this embodiment of the invention the serial interface 4 is an 8-bit interface, and the data out bus 11 of the ADC 3 is a 16-bit bus, a secondary switch, namely, a secondary multiplexer 29 is provided for alternately switching the high eight bits and the low eight bits of each conversion result from the ADC 3 to the first primary multiplexer 20 for transfer to the data in bus 12 of the serial interface 4 when the integrated circuit 1 is operating in the second mode. The transfer of the conversion results from the ADC 3 to the serial interface 4 through the switch circuit 8 will be described in more detail below.

Before the integrated circuit 1 can operate in the second mode with the ADC 3 communicating with the serial interface 4 independently of the microprocessor 2, the switch circuit 8 is initially configured by the microprocessor 2 as follows. The microprocessor 2 outputs appropriate addresses to the address decoder 15 for selecting appropriate registers in the ADC 3 and in the serial interface 4, which are to be used when the integrated circuit 1 is configured to operate in the second mode. The addresses are decoded in the address decoder 15, and applied to a register select input 38 of the ADC 3 and a register select input 39 of the serial interface 4. In this embodiment of the invention two data registers 30 and 31 are selected in the ADC 3 from which the conversion results are outputted, namely, a low data register 30 which stores the low eight bits of each data conversion, and a high data register 31 which stores the high eight bits of each data conversion. An 8-bit transmit register 33 in the serial interface 4 is selected by the decoded address from the address decoder 15 to which the conversion results are to be transferred from the ADC 3 for subsequent transmission from the serial interface 4 to the external device. The ADC 3 is responsive to the decoded address received from the address decoder 15 for putting a high on an enable independent mode output, namely, an en_ind_mode output 35 of the ADC 3. The first and second primary multiplexers 20 and 23 are responsive to the en_ind_mode output 35 going high for switching the ADC data out bus 11 and the write signal from the logic circuit 27 to the data in bus 12 and the write input 25, respectively, of the serial interface 4, for configuring the integrated circuit 1 in the second mode. The en_ind_mode output 35 goes low in response to an address from the microprocessor 2 decoded in the address decoder 15 for selecting the ADC 3 to operate in the dependent mode. A low on the en_ind_mode output 35 of the ADC 3 operates the first and second primary multiplexers 20 and 23 for switching the data out bus 9 of the microprocessor 2 and the write output 24 of the microprocessor 2 to the data in bus 12 and the write input 25, respectively, of the serial interface 4, thereby configuring the integrated circuit 1 in the first mode.

When configuring the integrated circuit 1 from the first mode to the second mode, as well as selecting the transmit register 33 in the serial interface 4, the microprocessor 2 also configures the serial interface 4 to operate in the appropriate one of a master mode and a slave mode. When configured in the master mode the data being transmitted from the transmit register 33 is transmitted under the control of the clock signal generated by the clock signal generator (not shown) of the integrated circuit 1. When configured in the slave mode, data being transmitted to the external device from the transmit register 33 is transmitted under the control of a clock signal generated by the external device. The microprocessor 2 also selects the polarity of the clock signal and the clock phase for the transmission of data when the serial interface 4 is being configured to operate in master mode.

The transfer of the conversion results from the ADC 3 to the serial interface 4 when the integrated circuit 1 is configured to operate in the second mode will now be described. An adc_busy output 36 of the ADC 3 remains high while the ADC 3 is converting a sampled analogue input. On the conversion being completed the adc_busy output 36 goes low, and remains low until conversion of the next sample of the analogue input signal is commenced. The sixteen bits of each conversion result from the ADC 3 are simultaneously transferred from the low and high data registers 30 and 31 on the data out bus 11 of the ADC 3 at the end of each conversion cycle when the adc_busy output 36 goes low. The low eight bits of each conversion result from the low data register 30 are latched into a temporary storing register, namely, a latch 37 on the falling edge of the adc_busy signal, while the high eight bits of the conversion result from the high data register 31 are switched through the secondary multiplexer 29 and the first primary multiplexer 20 to the transmit register 33 for transmission therefrom. The high eight bits of the conversion result from the high data register 31 are written to the transmit register 33 under the control of a write signal from the logic circuit 27 through the second primary multiplexer 23. On the high eight bits of the conversion result having been written to the transmit register 33, they are transmitted to the external device, under the control of a clock signal from the external device, or the clock signal generated by the clock signal generator (not shown) of the integrated circuit 1 depending on whether the serial interface 4 is configured in he slave mode or the master mode, respectively.

A counter 41 counts the clock signals transmitting the high eight bits of the conversion result from the transmit register 33. A comparator 42 reads the count from the counter 41, and on the count from the counter 41 reaching binary 100 corresponding to the high eight bits having been clocked out from the transmit register 33, the comparator 42 outputs a high which causes the secondary multiplexer 29 to select the latch 37, and the low eight bits latched in the latch 37 are written through the secondary multiplexer 29 and the first primary multiplexer 20 to the transmit register 33 under the control of the next write signal from the logic circuit 27. The low eight bits are then transmitted from the transmit register 33 to the external device as already described with reference to the high eight bits of the conversion result.

At any time after the high eight bits have been written to the transmit register 33 and the low eight bits have been latched in the latch 37, the ADC commences the next conversion, and the adc_busy output 36 goes high. When the next conversion result is ready the adc_busy output 36 goes low, the counter 41 is reset to zero on the falling edge of the adc_busy signal. Resetting the counter 41 to zero causes the comparator 42 to output a low, which in turn switches the secondary multiplexer 29 to select the high eight bits of the next conversion result, so that the high eight bits of the conversion result are transferred to the transmit register 33, while the low eight bits are latched into the latch 37 on the falling edge of the adc_signal. Thereafter transmission of the high eight bits from the transmit register 33 to the external device, the counting of the high eight bits from the transmit register 33 by the counter 41 and the subsequent writing of the low eight bits from the latch 37 to the transmit register 33, and the transmission thereof to the external device is similar to that already described, and so the operation of the integrated circuit 1 in the second mode continues.

The write pulse generation logic circuit 27 outputs the write signals to the write input 25 of the serial interface 4 for writing the high eight bits to the transmit register 33 in response to clock signals generated by the clock signal generator (not shown) of the integrated circuit 1 and the adc_busy output 36 going low indicating the end of a conversion cycle and that the conversion result is ready for transfer. The write signal for writing the low eight bits of each conversion result from the latch 37 is generated from the clock signal from the clock signal generator (not shown) of the integrated circuit 1 and from the output of the comparator 42 going high, indicating that the high eight bits of the conversion result have been transmitted from the transmit register 33.

When the integrated circuit 1 is operating in the second mode, the ADC 3 may be operated in any of a number of conversion modes. For example, the ADC 3 may be operated in a continuous conversion mode, in which case each conversion cycle would commence immediately on completion of the previous conversion cycle. When operating in the continuous conversion mode the ADC 3 would operate entirely independently of the microprocessor 2 in the second mode. Alternatively, the ADC 3 may be operated in a conversion mode, in which each conversion would be initiated by setting a control bit in a first control register 43 of the ADC 3. In this case the first control register 43 would be selected by an address decoded in the address decoder 15 from the microprocessor 2 applied to the register select input 38 of the ADC 3, and the bit would be written to the first control register 43 through a data input 44 of the ADC 3 by the microprocessor 2 on the data out bus 9 thereof. In this conversion mode while the conversion results would be transferred from the ADC 3 to the serial interface 4 independently of the microprocessor 2 in the second mode, the microprocessor 2 would be required to initiate each conversion. Another alternative conversion mode in which the ADC 3 could be operated would be in a timed conversion mode, whereby the conversion cycles would be initiated at predetermined time intervals. In this case, a control signal would be outputted by the microprocessor 2 each time a timer (not shown) of the microprocessor 2 timed the predetermined time interval, and the control signal would be applied to a conversion start input 45 of the ADC 3 for initiating each conversion cycle. In this conversion mode the ADC 3 would operate independently of the microprocessor 2 in the second mode for transferring the conversion results to the serial interface 4. Additionally, the ADC 3 could be operated in a conversion mode in which each conversion cycle would be initiated by an externally generated signal applied on a conversion start input, namely, a CONVST input 47 of the integrated circuit 1. The CONVST input 47 is connected to the conversion start input 45. Typically, an input signal on the CONVST input 47 would be toggled from low to high, depending on how the conversion start input 45 of the ADC 3 is configured, to commence a conversion. The conversion start input signal could be generated by any suitable source. In this case the ADC 3 would operate completely independently of the microprocessor 2 in the second mode.

Referring now to FIG. 2 there is illustrated a timing diagram of the transfer of a conversion result from the ADC 3 to the serial interface 4 when the integrated circuit 1 is operating in the second mode, and the serial interface 4 is configured to operate in the master mode. In this case the conversion is initiated by toggling the voltage on the CONVST input 47 low to high, see Waveform A. On the voltage on the CONVST input 47 being toggled a conversion cycle in the ADC 3 is commenced and the adc_busy output 36 goes high and remains high until, the conversion cycle has been completed at which stage the adc_output 36 goes low, see Waveform B. The conversion result is then transferred immediately from the ADC 3, the high eight bits being written to the transmit register 33, and the low eight bits being latched into the latch 37. At this stage the next conversion cycle could commence, although in this particular example the next conversion cycle does not commence until all of the sixteen bits have been transmitted from the transmit register 33. Waveform C illustrates the clock signal clocking the high and low eight bits from the transmit register 33, while waveform D illustrates the transfer of the high eight bits namely, ADCDATAH and the low eight bits ADCDATAL being transferred from the transmit register 33. The next conversion cycle is commenced when the signal on the CONVST input 47 is again toggled low.

When operating in the second mode, since conversion results are transferred from the ADC 3 independently of the microprocessor 2, the microprocessor 2 can carry out tasks without interruption from the ADC 3, and if not required, the microprocessor 2 can be operated in a low power mode.

In order to configure the integrated circuit 1 from the second mode to the first mode whereby the ADC 3 operates under the control of the microprocessor 2, the microprocessor 2 outputs appropriate addresses to the address decoder 15 which are decoded and outputted to the register select input 38 of the ADC 3 and the register select input 39 of the serial interface 4. The decoded address from the address decoder 15 to the ADC 3 puts a low on the en_ind_mode output 35 of the ADC 3, which in turn switches the first and second primary multiplexers 20 and 23 for selecting the data out bus 9 of the microprocessor 2 and the write output 24 of the microprocessor 2. The microprocessor 2 is thus in direct communication with the serial interface 4 through the respective first and second primary multiplexers 20 and 23, respectively, and data to be outputted from the microprocessor 2 through the serial interface 4 is outputted through the first primary multiplexer 20 under the control of write signals from the write output 24 of the microprocessor 2 through the second primary multiplexer 23. Additionally, data inputted to the integrated circuit 1 through the serial interface 4 is written to the microprocessor 2 through the main multiplexer 14 which is appropriately switched under the control of the microprocessor 2. In the first mode conversion results are read from the ADC 3 by the microprocessor 2 through the main multiplexer 14, and may be processed by the microprocessor 2 or transferred under the control of the microprocessor 2 to other components, for example, RAM (not shown) on the integrated circuit 1, or can be transferred under the control of the microprocessor 2 through other I/O ports (not shown) of the integrated circuit 1, or through the serial interface 4 through the switch circuit 8.

Additionally, when the integrated circuit is configured in the first mode the microprocessor 2 carries out other tasks unconnected with the ADC 3 as will be readily apparent and understood by those skilled in the art. When a conversion result is ready, the adc_busy output 36 goes low, and may act as an interrupt to the microprocessor 2, which would interrupt the task in hand, and the microprocessor 2 would deal with the conversion result appropriately.

Memory, which in this embodiment of the invention is provided by a flash memory 48, is provided in the integrated circuit 1 for storing an executable primary code for controlling the operation of the integrated circuit 1 between the first mode and the second mode. The primary code may be written to the flash memory at factory set-up, or may be written subsequently. The primary code is executable by the microprocessor 2 for configuring the integrated circuit 1 in the first mode and the second mode. The primary code includes instructions to the microprocessor 2 under which conditions the microprocessor 2 is to configure the integrated circuit 1 in the first mode or the second mode. For example, the primary code may include an instruction under which normal operation of the integrated circuit 1 would be in the first mode, and the microprocessor 2 would only configure the integrated circuit 1 in the second mode in the event of a large batch of conversions of one or more analogue input signals being required to be made on the input Ain 5. Additionally, the primary code in the flash memory 48 may include an instruction to the microprocessor 2 that on a particular externally generated command being received by the microprocessor 2 through the serial interface 4 or any of the other I/O ports (not shown) the integrated circuit 1 would be configured from the first to the second mode and/or vice versa. It will be readily apparent to those skilled in the art that various other conditions could be included in the primary code in the flash memory 48 under which the integrated circuit 1 would be configured from the first mode to the second mode or vice versa.

In use, if the integrated circuit 1 is initially set up to operate in the first mode with the ADC 3 operating under the control of the microprocessor 2, as already described, data to be outputted from the microprocessor 2 through the serial interface 4 is transferred from the microprocessor 2 through the switch circuit 8 to the serial interface 4. Data to be inputted to the microprocessor 2 through the serial interface 4 is transferred from the serial interface 4 on the data out bus 13, the main multiplexer 14 and the data in bus 10 of the microprocessor 2. Conversion results are transferred from the ADC 3 under the control of the microprocessor 2. When the integrated circuit 1 is operating in the first mode the ADC 3 could be operated in any of the conversion modes already discussed. The integrated circuit 1 continues to operate in the first mode, until the microprocessor 2 under the control of the primary code in the flash memory 4B configures the integrated circuit 1 from the first mode to the second mode. To configure the integrated circuit 1 from the first mode to the second mode, the microprocessor 2 outputs appropriate addresses to the address decoder 15, which are decoded and applied to the register select inputs 38 and 39 of the ADC 3 and the serial interface 4 for selecting the appropriate registers. Additionally, the microprocessor 2 configures the serial interface 4 in the desired one of the master mode and the slave mode depending on the primary code, and depending on the primary code an externally generated command may also be required to be inputted to the microprocessor 2. The polarity and the phase of the clock signal for transmitting conversion results from the transmit register 33 are also selected in the serial interface 4 if appropriate, as is the conversion mode in which the ADC 3 is to operate. The ADC 3 outputs a high on the en_ind_mode output 35 which configures the first and second primary multiplexers 20 and 23 to switch the data out bus 11 of the ADC 3 and the logic circuit 27 to the data in bus 12 and the write input 25 of the serial interface 4. Thereafter the conversion results from the ADC 3 are transferred directly through the switch circuit 8 to the serial interface 4 for transmission to the external device independently of the microprocessor 2. The integrated circuit 1 is configured from the second mode to the first mode by the microprocessor 2 under the control of the primary code in the flash memory 48, and depending on the primary code an externally generated command may also be required to be inputted to the microprocessor 2.

Figure 3:
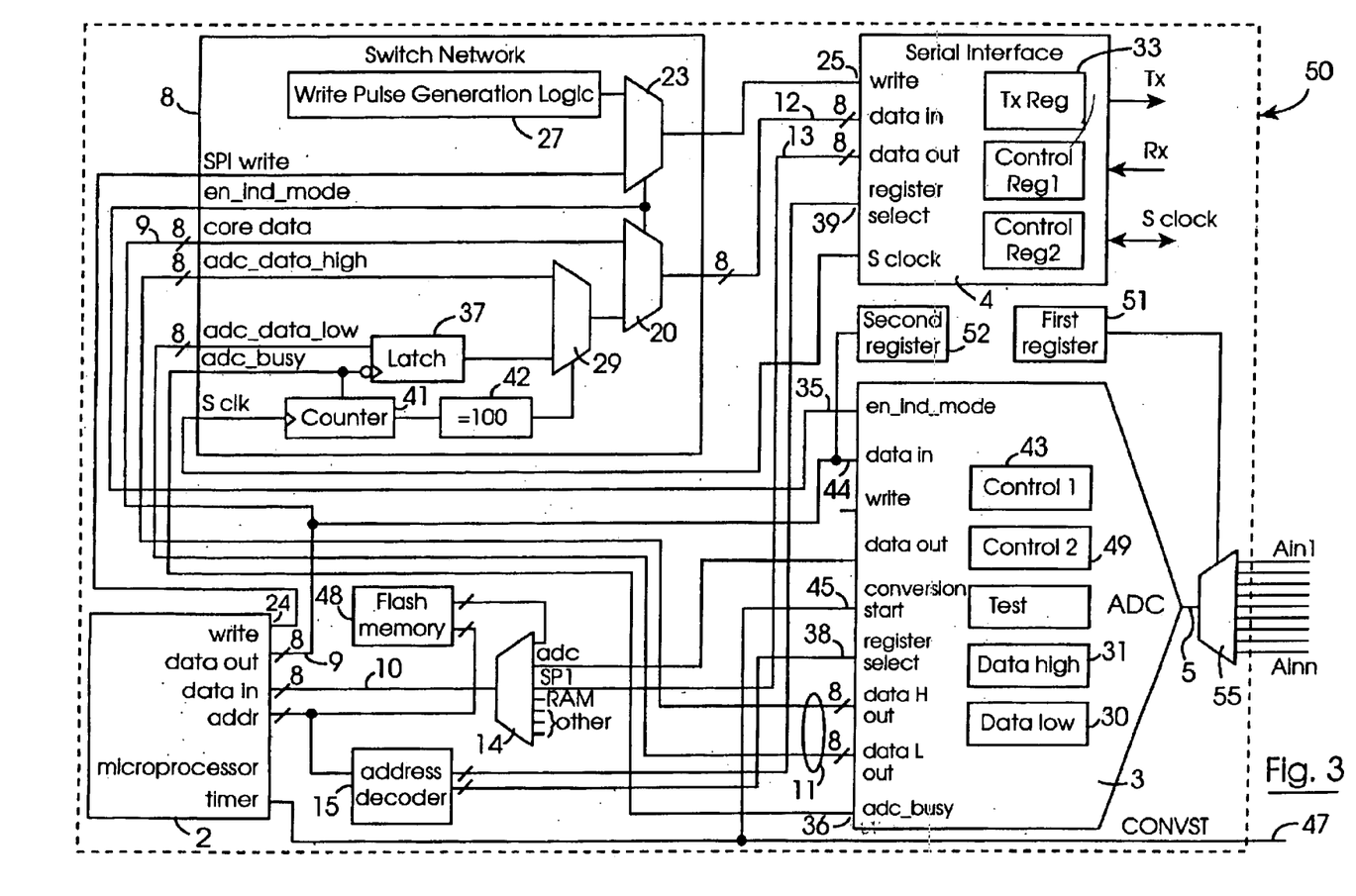
FIG. 3 is a block representation similar to FIG. 1 of an integrated circuit according to another embodiment of the invention.

Referring now to FIG. 3 there is illustrated an integrated circuit according to another embodiment of the invention indicated generally by the reference numeral 50. The integrated circuit 50 is substantially similar to the integrated circuit 1 and similar components are identified by the same reference numerals. The main difference between the integrated circuit 50 and the integrated circuit 1 is that the ADC 3 is suitable for converting a plurality of analogue signals received on a plurality of corresponding input channels Ain1 to Ainn. An input multiplexer 55 is provided for selectively switching the analogue input channels Ain1 to Ainn to the analogue input Ain 5 of the ADC 3. Two additional registers, namely, a first register 51 and a second register 52 are provided for controlling conversions in the ADC 3, when the integrated circuit 50 is operating in the second mode. The first register 51 holds a first control code for controlling the input multiplexer 55, for in turn controlling the sequence in which the channels Ain1 to Ainn are selected. The second register 52 holds a second control code which determines the number of conversions to be made per channel. The second control code is applied to the data input 44 of the ADC 3, and in turn to a second control register 49 in the ADC 3 for selecting the number of conversions to be carried out by the ADC 3 on the input signals of each channel Ain1 to Ainn. The respective first and second control codes are written to the first and second registers 51 and 52 by the microprocessor 2 under the control of the primary code in the flash memory 48, and may or may not be in response to appropriate inputs from a user or from the external device to which the conversion results are to be transmitted. Otherwise, the integrated circuit 50 is similar to the integrated circuit 1 and its operation is likewise similar. The ADC 3 and the input multiplexer 55 could also be operated under the control of the first and second registers 51 and 52 when the integrated circuit 1 is configured to operate in the first mode.

While the input multiplexer for selectively switching the analogue input channels to the analogue input of the ADC has been described as being provided in the integrated circuit as an on-chip component, the input multiplexer may be provided externally of the integrated circuit as an off-chip component.

While the signal for operating the switch circuit 8 to configure the integrated circuit 1 in the respective first and second modes is provided by the en_ind_mode output 35 from the ADC 1, a mode select signal could be outputted directly from the microprocessor 2, however, in the implementations of the integrated circuits according to the invention described with reference to FIGS. 1 and 3 it is more convenient to output the mode select signal to the switch circuit 8 from the ADC 3 on the en_ind_mode output 35.

It is also envisaged that other programmable non-volatile memory besides flash memory may be provided on the integrated circuit for storing the primary code.

While the ADC has been described as having a twelve bit resolution with a sixteen bit output word, and the microprocessor has been described as being a microprocessor with a data word width of eight bits, it will be readily apparent to those skilled in the art that the resolution of the ADC and the data word width of the microprocessor is unimportant to the invention. The microprocessor may have a data word width of any desired width, and the ADC may be of any desired resolution, with a data word of any desired width. However, where the data word widths of the microprocessor and the ADC are different, and where the data output word of the ADC is greater than the data word width of the microprocessor and the serial interface, the arrangement of the secondary multiplexer and the latch in the switch circuit is required. Otherwise, where the data word widths of the ADC and the microprocessor are similar, the secondary multiplexer and the latch may be omitted from the switch circuit.

While the ADC has been described as being capable of converting at a specific conversion rate, and the microprocessor has been described as being capable of executing instructions at a specific rate, the ADC may be capable of operating at any desired conversion rate, and similarly, the microprocessor may be capable of executing instructions at any desired rate.

While the interface through which the data is outputted from the switch circuit when the integrated circuit is configured in the secondary mode has been described as being a serial protocol interface, the interface may be any interface, whether a serial interface or a parallel interface, and where the interface is a serial interface, it may be any other serial interface besides a serial protocol interface.

We claim:

1. An integrated circuit comprising:
   a microprocessor,
   an analog to digital converter (ADC),
   an interface for communicating the integrated circuit with an external device,
   a switch circuit for selectively and alternately configuring the integrated circuit to operate in a first mode with the microprocessor communicating with the interface through the switch circuit and the ADC operating in a dependent mode under the control of the microprocessor, and a second mode with the ADC operating in an independent mode communicating with the interface through the switch circuit for transferring conversion results from the ADC through the interface to an external device independently of the microprocessor.

2. An integrated circuit as claimed in claim 1 in which the interface is an N-bit interface, and the ADC is of M-bit resolution, M being greater than N.

3. An integrated circuit as claimed in claim 2 in which a temporary storing register is provided for storing some of the M bits of each conversion result, while the other of the M bits of the conversion result are being transferred from the ADC to the interface.

4. An integrated circuit as claimed in claim 3 in which the switch circuit selectively and alternately communicates the interface with the temporary storing register and the ADC for selectively and alternately transferring the bits stored in the temporary storing register to the interface and the bits to be transferred directly from the ADC to the interface.

5. An integrated circuit as claimed in claim 4 in which the switch circuit is responsive to a signal from the interface for selectively communicating the interface with the temporary storing register for transferring the bits of the conversion result from the temporary storing register to the interface.

6. An integrated circuit as claimed in claim 5 in which the interface is a serial interface, and a counter is provided responsive to a clock signal clocking the bits out of the interface to the external device for counting the bits being transmitted from the interface, and the switch circuit is responsive to the counter for communicating the temporary storing register with the interface.

7. An integrated circuit as claimed in claim 2 in which the data word width of the microprocessor is N-bits.

8. An integrated circuit as claimed in claim 1 in which the microprocessor is responsive to a primary code stored in memory of the integrated circuit for operating the switch circuit for selectively and alternately configuring the integrated circuit to operate in the first mode and the second mode.

9. An integrated circuit as claimed in claim 8 in which a first register is provided communicable with an input switch circuit for selectively switching a plurality of analogue input channels to the ADC, the first register being provided for storing a first control code for controlling the input switch circuit for selecting a sequence in which the analog input channels are to be switched to the ADC by the input switch circuit.

10. An integrated circuit as claimed in claim 9 in which the first control code is writeable to the first register by the microprocessor.

11. An integrated circuit as claimed in claim 10 in which the first control code is writeable to the first register by the microprocessor under the control of the primary code stored in the memory.

12. An integrated circuit as claimed in claim 9 in which a second register is provided communicable with the ADC, the second register being provided for storing a second control code for selecting the number of samples to be taken of each analog input signal switched to the ADC through the input switch circuit from the analogue input channels.

13. An integrated circuit as claimed in claim 12 in which the second control code is writeable to the second register by the microprocessor.

14. An integrated circuit as claimed in claim 12 in which the second control code is writeable to the second register by the microprocessor under the control of the primary code stored in the memory.

15. An integrated circuit as claimed in claim 8 in which the memory is flash memory.

16. An integrated circuit as claimed in claim 8 in which the microprocessor is responsive to an externally generated signal for selectively and alternately configuring the integrated circuit to operate in the first mode and in the second mode.

17. An integrated circuit as claimed in claim 1 in which conversion results are transferred from the ADC to the interface when the integrated circuit is operating in the second mode without interfering with the operation of the microprocessor.

18. An integrated circuit as claimed in claim 1 in which the switch circuit is responsive to the microprocessor for configuring the integrated circuit to operate in the first and second modes.

19. An integrated circuit as claimed in claim 1 in which the interface is configurable by the microprocessor for transmitting conversion results from the ADC to the external device in the independent mode of operation of the ADC.

20. An integrated circuit as claimed in claim 1 in which the interface is selectively configurable by the microprocessor in one of a master mode and a slave mode for facilitating transmission of the conversion results to the external device from the ADC in the independent mode of operation of the ADC.

21. An integrated circuit as claimed in claim 1 in which the ADC is selectively and alternately configurable by the microprocessor to operate alternately in the independent mode and the dependent mode.

22. An integrated circuit as claimed in claim 1 in which the switch circuit is responsive to a signal outputted by the ADC in response to the ADC being configured by the microprocessor to operate in the one of the dependent mode and independent mode for configuring the integrated circuit to operate in the corresponding one of the first mode and the second mode.

23. An integrated circuit as claimed in claim 1 in which each conversion result is transferred from the ADC to the interface in response to a signal from the ADC indicating the conversion result is ready.

24. An integrated circuit as claimed in claim 1 in which the interface is a serial interface.

25. An integrated circuit as claimed in claim 1 in which the interface is a serial protocol interface (SPI).

26. A method for operating an integrated circuit comprising an on-chip microprocessor, an on-chip analog-to-digital converter (ADC) and an on-chip interface so that the ADC can carry out conversions independently of the microprocessor, the method comprising the steps of providing an on-chip switch circuit for selectively and alternately communicating the interface with the microprocessor and the ADC, and operating the switch circuit for selectively and alternately configuring the integrated circuit to operate in a first mode with the microprocessor communicating with the interface through the switch circuit and the ADC operating in a dependent mode under the control of the microprocessor, and a second mode with the ADC operating in an independent mode communicating with the interface through the switch circuit for transferring conversion results from the ADC through the interface to an external device independently of the microprocessor.

27. A method as claimed in claim 26 in which a primary code is stored in a memory in the integrated circuit chip, and the microprocessor is operable under the control of the primary code for configuring the integrated circuit between the first and second modes.

28. A method as claimed in claim 27 in which the primary code is stored in a flash memory.

29. A method as claimed in claim 26 in which conversion results are transferred from the ADC to the interface when the integrated circuit is operating in the second mode without interfering with the operation of the microprocessor.

30. An integrated circuit as claimed in claim 26 in which the microprocessor operates the switch circuit for selectively and alternately configuring the integrated circuit to operate in the first mode and the second mode.

31. A method as claimed in claim 26 in which the microprocessor selectively configures the interface for transmitting conversion results from the ADC to the external device in the independent mode of operation of the ADC.

32. A method as claimed in claim 26 in which the microprocessor selectively and alternately configures the interface in a master mode and a slave mode for facilitating transmission of the conversion results to the external device from the ADC in the independent mode of operation of the ADC.

33. A method as claimed in claim 26 in which the microprocessor selectively and alternately configures the ADC to operate in the independent mode and the dependent mode.

\* \* \* \* \*

UNITED STATES PATENT AND TRADEMARK OFFICE
CERTIFICATE OF CORRECTION

PATENT NO. : 6,831,583 B1
DATED : December 14, 2004
INVENTOR(S) : O'Dowd et al.

It is certified that error appears in the above-identified patent and that said Letters Patent is hereby corrected as shown below:

Column 9,
Line 5, should read -- 37 on the falling edge of the adc_busy signal. Thereafter trans- --.

Column 10,
Line 16, should read -- been completed at which stage the adc_busy output 36 goes low, --.

Column 11,
Line 53, should read -- of the primary code in the flash memory 48 configures the --.

Signed and Sealed this

Twenty-third Day of August, 2005

JON W. DUDAS
*Director of the United States Patent and Trademark Office*